2,993,854
METHOD OF REGENERATING REFORMING CATALYSTS

Louis D. Friedman, Beacon, N.Y., assignor to Texaco Inc., New York, N.Y., a corporation of Delaware
No Drawing. Filed July 30, 1959, Ser. No. 830,458
8 Claims. (Cl. 208—136)

This invention relates to a process for the treatment of catalysts used in the high temperature conversion of hydrocarbons as well as to novel catalyst compositions. More particularly, the present invention is directed to improvements in the regeneration of hydrocarbon conversion catalysts which have become deactivated during the conversion of naphthas or other light hydrocarbon fractions into motor fuels.

It is known that petroleum naphthas can be subjected to a reforming treatment to yield liquid products boiling within the gasoline boiling range which possess improved octane numbers. A well known and widely used reforming process for upgrading petroleum naphthas is called hydroforming. In hydroforming, the naphtha feed stock is catalytically treated at elevated temperatures such as 600° to 1100° F., and pressures of 50 to 5000 pounds per square inch, in the presence of hydrogen or a recycle gas rich in hydrogen. A variety of reactions including dehydrogenation, paraffin and naphthene isomerization, cyclization or aromatization, hydrogenation and hydrocracking occur during hydroforming. All of these reactions contribute to the production of a product of excellent quality not only because of its higher octane number but also because of its improved cleanliness characteristics due to the elmination of gum-forming unsaturated constituents, if present in the feed stocks, and impurities comprising sulfur, nitrogen, arsenic and the like which are objectionable constituents in modern motor gasolines.

It is known that zinc chromite catalysts have been used in upgrading petroleum naphthas for use as motor fuels. It is further known that the metal chromites and particularly zinc oxide-zinc chromites have been employed in a wide variety of catalytic processes including the synthesis of oxygenated organic compounds from a mixture of hydrogen and oxides of carbon or in the water gas shift reaction and the like. Such catalysts in the past have been prepared by decomposing metal chromates at atmospheric pressure.

It is further known that reforming catalysts including zinc chromites employed in upgrading feed stocks to motor naphthas tend to lose their catalytic activity and selectivity during reforming operations due to the build-up of carbon and carbonaceous deposits on the catalysts. The spent catalysts are then subjected to a regeneration operation wherein the carbonaceous deposits are burned-off in an oxygen-containing atmosphere at high temperatures. Such known oxidative regeneration procedures are capable of restoring the spent catalyst to substantially its initial levels of activity and selectivity.

In such known oxidative regeneration procedures for treating a spent reforming catalyst, one of the main disadvantages is the amount of time required to regenerate the catalyst which may, for example, vary from about 10 to 60 hours. When the regeneration phase is conducted in the reforming unit the unit is not available for reforming operations. On the other hand, if the spent catalyst is displaced in the reformer with a new batch of fresh catalyst or a regenerated batch, the reforming unit is not on stream during the changeover.

The non-productive time of the reforming unit is thus a contributing factor in measuring the overall efficiency of a reforming process as it is costly in time, materials, and labor.

Accordingly, the present invention comprises a method of hydroforming a petroleum naphtha by treating the naphtha with hydrogen at an elevated temperature and pressure in the presence of a zinc oxide-zinc chromite catalyst containing antimony oxide and periodically regenerating said catalyst by oxidation thereof at an elevated temperature. The presence of antimony oxide substantially decreases the time required to regenerate the catalyst after the build-up of carbonaceous deposits thereon during the reforming operation.

The invention also comprises a novel catalyst composition consisting of a zinc oxide-zinc chromite catalyst containing antimony oxide with or without an alumina catalyst support.

The catalyst compositions of the present invention can contain from 5 to 85.5% of free zinc oxide, 5 to 85.5% of zinc chromite (as $ZnCr_2O_4$) and from about 5 to about 50% of an oxide of antimony, said percentages being by weight. The novel catalyst compositions of the present invention can also contain from 10 to 90% by weight of an alumina catalyst support.

Suitable antimony compounds for use in the present invention are antimony oxides and antimony compounds convertible to the oxides. Conversion of antimony compounds to the oxides can be carried out by known methods such as, for example, by calcination or by calcination in the presence of air, or an oxygen-containing gas or steam. Representative examples of such antimony compounds are trichloride, pentachloride, oxychloride, oxytrichloride, tetraoxide, pentoxide and the tartrate.

An advantage of the present invention is to provide an improved zinc oxide-zinc chromite catalyst for the catalytic conversion of petroleum hydrocarbons into high quality motor fuels. A futher advantage is that the oxidative reactivation of spent zinc oxide-zinc chromite reforming catalysts is carried out in a more efficient manner. Still further advantages accruing from the process of the present invention will become more readily apparent to those skilled in the art from the following detailed description.

As referred to hereinabove it is customary to effect regeneration of a spent reforming catalyst in the following manner. An oxygen-containing gas such as air which is preferably diluted with flue gas, steam, nitrogen or other inert gas is passed over the catalyst while maintaining the catalyst undergoing regeneration at an elevated temperature, for example, a temperature within the range of from about 800° F. to about 1100° F., and advantageously from about 850° F. to 1050° F. The carbonaceous deposits on the spent catalyst are removed by this controlled burning treatment. During regeneration, the flame front temperature is controlled by the rate of flow of the oxygen-containing gas so as to not exceed the preselected maximum desired temperature.

The same general procedures is followed in regenerating the catalysts of the present invention. It is preferred, in the practice of the present invention, that the regeneration operation be carried out at a superatmospheric pressure within the range of from about 40 to about 120 pounds per square inch gauge, and preferably from about 50 to 100 p.s.i.g. for the most satisfactory results.

Prior to and also subsequent to the regeneration operation it is desirable to purge the reaction chamber or the regeneration zone with a purging gas which is inert with respect to the catalyst. In addition, the purge gas employed should be substantially free from reactive gases such as hydrogen, oxygen or oxides of carbon. Particularly suitable purging gases are nitrogen, steam, helium, argon and the like.

The catalyst compositions of the present invention can be prepared in a number of known ways. For example the zinc oxide-zinc chromite component can be prepared by the thermal decomposition of a basic zinc ammonium chromate as more particularly described in Lazier, U.S. Patents 1,746,782, 1,746,783 and 1,964,001. The decomposed powder, consisting essentially of free zinc oxide and zinc chromite, is crushed and sieved to a suitable mesh size, for example 20–100 mesh. The sieved material can then be blended with the antimony oxide providing component. The resulting mixture can then be dried at about 212° F. to eliminate water vapor, followed by calcination of the dried mixture at an elevated temperature such as about 1000° to 1100° F.

An alternate method comprises forming the zinc oxide-zinc chromite component and calcining it at about 800–900° F., sieving the calcined material, thereafter impregnating the calcined mixture with the antimony oxide providing component followed by a drying step at about 212° F., and then calcining the dried material at about 1000° F. The impregnation step is conducted in a conventional manner using, for example, an aqueous solution of the antimony oxide providing material for impregnation.

The resulting calcined mixture can then be shaped into the desired form, such as pellets, by blending a portion of the mixture with a pelleting lubricant such as Sterotex, a hydrogenated vegetable fat, and subjecting same to known pelleting operations.

Other known methods of preparing catalyst compositions are also suitable in preparing the novel catalyst compositions of the present invention.

A preferred method for preparing the catalyst compositions is more fully disclosed hereinafter in the specific examples.

EXAMPLE 1

A zinc oxide-zinc chromite catalyst on an alumina catalyst support consisting essentially of 5.14% by weight of zinc oxide, 13.99% zinc chromite, the balance alumina support and incidental impurities was prepared in the following manner:

Solution A was prepared by dissolving 7134 grams of zinc nitrate hexahydrate in 16 liters of water. Solution B was prepared by mixing 3036 grams of ammonium dichromate in 10 liters of water with 2.4 liters of concentrated ammonium hydroxide in 4 liters of water.

Solutions A and B were added slowly, simultaneously and at equal rates with agitation to two mixing vessels each containing approximately 2.5 liters of water. Stirring was continued for 0.5 hour. There was then added to the stirred mixtures a total of 0.7 liter of 29% ammonium hydroxide to ensure that precipitation was complete in both vessels.

The precipitates, consisting essentially of basic zinc ammonium dichromate, were allowed to settle and the supernatant liquids were decanted. The precipitates were separately washed three times each by decantation with 5 liters of water, thereafter combined, and dried on a steam plate. The combined dried precipitate was decomposed by heating small portions thereof to decomposition temperature (600° F.); followed by calcination at 800° F. for 3 hours. The calcined product was then sieved through a 20 mesh screen and there was obtained 3183 grams of zinc oxide-zinc chromite powder.

The sieved material in an amount of 1816 grams was mixed with 7264 grams of a 100 mesh alumina catalyst support type Alcoa F-10, mainly gamma alumina, which had previously been dried for 3 hours at 600° F. The resulting mixture was then blended with 3% by weight of a fatty pelleting lubricant sold under the trade name "Sterotex" and the blend was pelleted in 5/32 inch dies in a known manner.

The pellets were calcined at 1000° F. for 3 hours. There was obtained 9600 grams of gray pellets comprising by analysis 8.05% by weight of zinc, 6.235% by weight of chromium. The composition was 5.14% zinc oxide, 13.99% zinc chromite, and 80.87% alumina as $Al_2O_3$ (by difference).

EXAMPLE 2

A portion of the catalyst prepared as shown above was calcined at 1000° F. overnight. 714 grams of the calcined material were blended with 62 grams of reagent grade antimony trioxide ($Sb_2O_3$) and 124 grams of tartaric acid in 0.5 liter of boiling water. The resulting blend was dried on a steam plate and then calcined for 4 hours at 1000° F. There was obtained 736 grams of gray pellets, corresponding to 4.73% by weight of zinc oxide, 12.87% zinc chromite, 74.41% alumina and 7.99% antimony trioxide. On an alumina-free basis, the composition is 18.49% zinc oxide, 50.29% zinc chromite, and 31.22% antimony oxide.

EXAMPLE 3

A fluid catalytic cracked naphtha was passed over the catalyst of Example 2 at a temperature of 1025° F., 500 p.s.i.g., a hydrogen feed rate of 4240 standard cubic feet per barrel, a hydrogen recycle rate of 8000 s.c.f./bbl. and a space velocity of 0.5 volume of charge per hour per volume of catalyst.

Inspection tests on the reformer products are set forth in Table A below.

At the end of 8 hours on stream the catalyst was regenerated in the following manner:

The reforming reaction vessel, consisting of an electrically heated 2 inch internal diameter chrome steel down flow type reactor containing 750 cc. (715 grams) of the used catalyst centrally located therein, was pressurized with nitrogen gas, until an internal pressure of about 70 p.s.i.g. was attained. The nitrogen gas was recycled until the reactor temperature reached 925° F. A pressurized stream of air (60–70 p.s.i.g.) was then passed through the heated, pressurized reactor at a rapid flow rate to burn off the carbon deposits on the catalyst particles. The maximum flame front temperature was less than 1150° F. and the overall bed temperature during the burn varied from a low of about 930° F. to a high of about 1070° F. At the end of 4 hours there was no evidence of hot spots in the reactor; an indication that regeneration was complete.

EXAMPLE 4

The regenerated catalyst of Example 3 was employed in reforming the same motor naphtha charge for an additional 8 hour period under the same conditions as those used in Example 3 except that the reforming temperature was increased to 1075° F. This run was conducted to evaluate the catalyst under conditions whereby there is a greater tendency toward a more rapid build-up of carbonaceous deposits.

Results of inspection tests on the product of this run are also shown in Table A below:

The catalyst employed in this run was again subjected to regeneration in the same manner as described in Example 3. Regeneration was continued for 5 hours. The overall range of temperature in the reactor during the regeneration step varied from a low of about 985° F. to a high of 1150° F.

*Table A*

|  | Ex. 3 | Ex. 4 |
|---|---|---|
| Reforming Conditions: | | |
| Time on Stream, hrs | 8 | 8 |
| Temperature, °F | 1,025 | 1,075 |
| Liquid Recovery, wt. percent | 83.8 | 69.1 |
| Inspection Tests—IBP-400° F. Fraction: | | |
| Wt. percent of charge | 40.3 | 35.5 |
| Hydrocarbon Analysis, Vol. Percent— | | |
| Aromatics | 57 | 68 |
| Olefins | 1 | 1 |
| Saturates | 42 | 31 |
| Research Octane No. (Micro)— | | |
| Clear | 91.6 | 99.4 |
| +3 cc. TEL | 97.9 | 102.5 |

EXAMPLE 5

The zinc oxide-zinc chromite catalyst of Example 1 was used in reforming the motor naphtha used in Example 3, under the same conditions as set forth therein for an 8 hour period. The catalyst was then regenerated in the manner described in Example 3. The time required to regenerate the catalyst was 16 hours, in contrast to the 4 hours of Example 3.

EXAMPLE 6

Another reforming run was made in the manner described in Example 3 using the catalyst of Example 1. After 8 hours of reforming at 1075° F., other conditions being the same, the spent catalyst was also regenerated. The time required to regenerate the spent catalyst was 17 hours.

EXAMPLE 7

Following the procedure described in Example 5 and using the same catalyst as Example 1, a reforming run was conducted to 3.5 hours at 1075° F. The time required to regenerate the used catalyst amounted to 10.5 hours.

Table B below summarizes the data presented in Examples 3–7 inclusive.

*Table B*

| Example | 3[1] | 4[1] | 5 | 6 | 7 |
|---|---|---|---|---|---|
| Reforming Temp., °F | 1,025 | 1,075 | 1,025 | 1,075 | 1,075 |
| Reforming Time, Hrs | 8 | 8 | 8 | 8 | 3.5 |
| Regeneration Time, Hrs | 4 | 5 | 16 | 17 | 10.5 |
| Regeneration Press., p.s.i.g | 70 | 70 | 70 | 70 | 70 |

[1] Contained antimony oxide.

Inspection of the data in the above table show the beneficial effects accruing from the presence of an oxide of antimony in a zinc oxide-zinc chromite reforming catalyst.

While specific reference has been made throughout the specification and claims to reforming operations it is to be understood that the novel features of the present invention are also applicable to catalytic hydrocarbon conversion processes generally, such as for example, desulfurization, denitrogenation, hydrogenation, hydroforming, cracking, hydrocracking and the like.

Obviously, many modifications and variations of the invention, as hereinbefore set forth, may be made without departing from the spirit and scope thereof, and therefore only such limitations should be imposed as are indicated in the appended claims.

I claim:

1. A method for hydroforming a petroleum naphtha comprising treating said naphtha with hydrogen at an elevated temperature and pressure in the presence of a zinc oxide-zinc chromite catalyst containing 5 to 50% by weight antimony oxide, and periodically regenerating said catalyst by oxidation thereof at an elevated temperature.

2. A method for regenerating a zinc oxide-zinc chromite catalyst spent during hydroforming comprising incorporating 5 to 50% by weight antimony oxide prior to hydroforming and oxidizing said catalyst at an elevated temperature in the presence of said antimony oxide.

3. In a method for hydroforming a petroleum naphtha at an elevated temperature and a superatmospheric pressure in the presence of a zinc oxide-zinc chromite catalyst whereby said catalyst during the hydroforming operation declines in activity due to the build-up of carbonaceous deposits thereon, and said deactivated catalyst is subjected to oxidative regeneration at an elevated temperature to remove the built-up carbonaceous deposits whereby the initial reforming activity of the catalyst is substantially restored, the improvement which comprises prior to the hydroforming step, incorporating into the catalyst about 5 to 50% by weight of an oxide of antimony; and, during the regeneration step, carrying out regeneration at a super-atmospheric pressure.

4. Method of claim 3 wherein the oxide of antimony is antimony trioxide.

5. Method of claim 3 wherein the catalyst contains from about 10% to about 45% by weight of antimony oxide.

6. Method as claimed in claim 3 wherein the catalyst contains antimony oxide in an amount of from about 25 to about 35% by weight.

7. Method of claim 3 wherein regeneration is carried out at a pressure within the range of from about 50 to about 100 pounds per square inch gauge.

8. A zinc oxide-zinc chromite hydroforming catalyst containing from about 5 to 85.5% of zinc oxide, 5 to 85.5% of zinc chromite and from about 5 to about 50%, by weight, of antimony oxide as $Sb_2O_3$.

References Cited in the file of this patent

UNITED STATES PATENTS

| 1,746,782 | Lazier | Feb. 11, 1930 |
| 2,209,458 | Heard et al. | July 30, 1940 |
| 2,783,185 | Hughes et al. | Feb. 26, 1957 |